Figure 1:
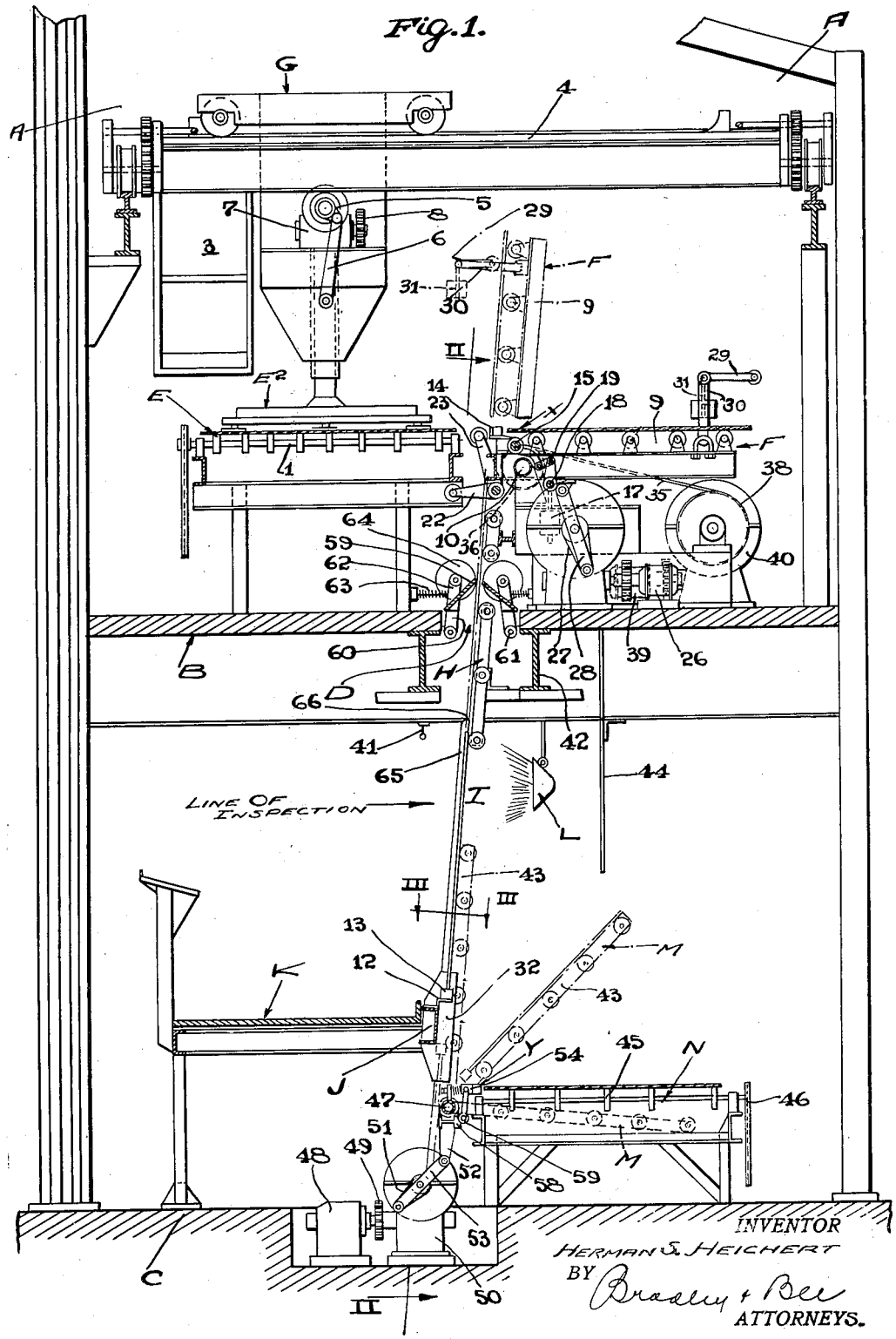

Dec. 11, 1934. H. S. HEICHERT 1,983,755
APPARATUS FOR HANDLING AND INSPECTING PLATE GLASS
Filed March 9, 1934 4 Sheets-Sheet 1

INVENTOR
HERMAN S. HEICHERT
BY Bradley & Bee
ATTORNEYS.

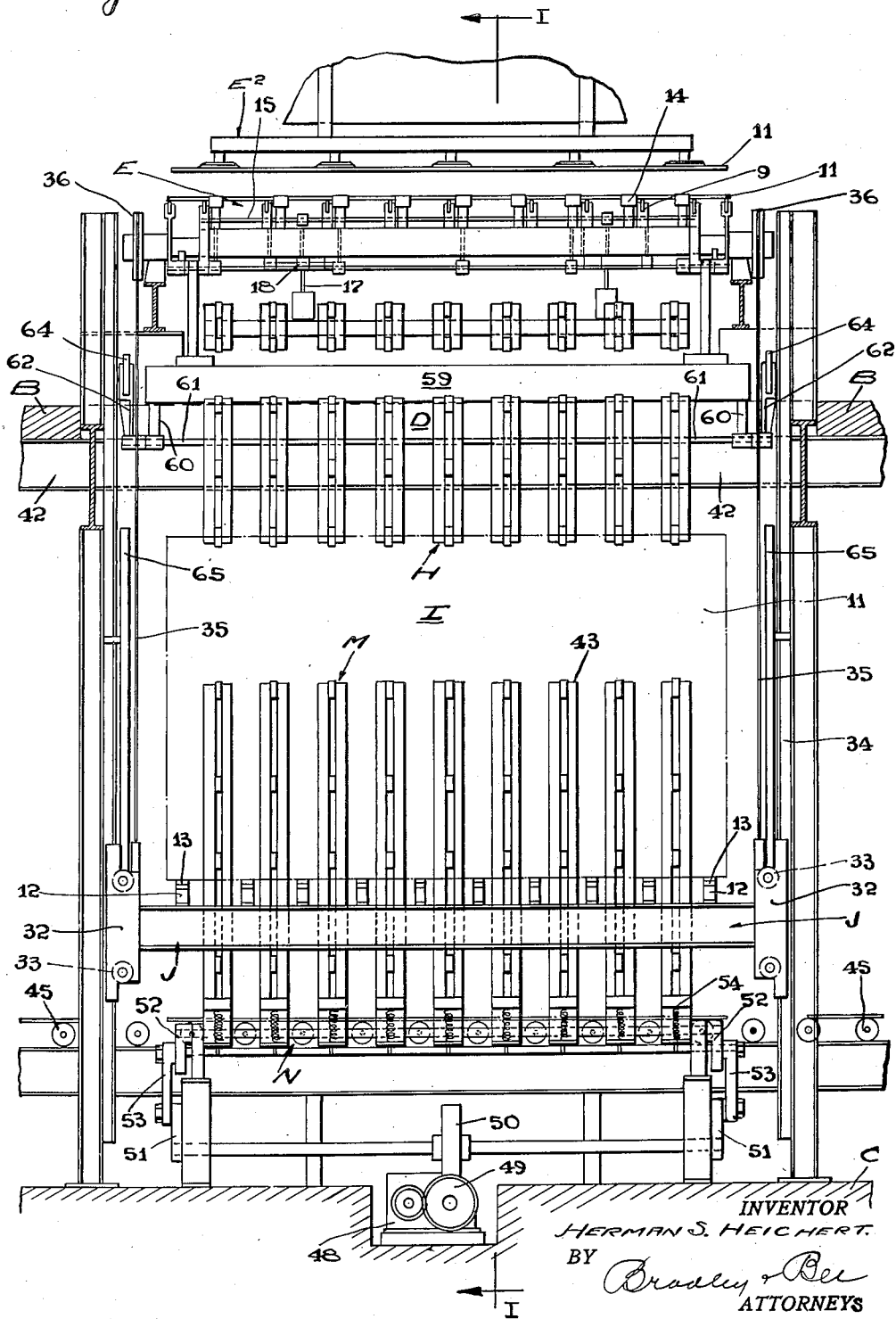

Dec. 11, 1934.  H. S. HEICHERT  1,983,755
APPARATUS FOR HANDLING AND INSPECTING PLATE GLASS
Filed March 9, 1934  4 Sheets-Sheet 3
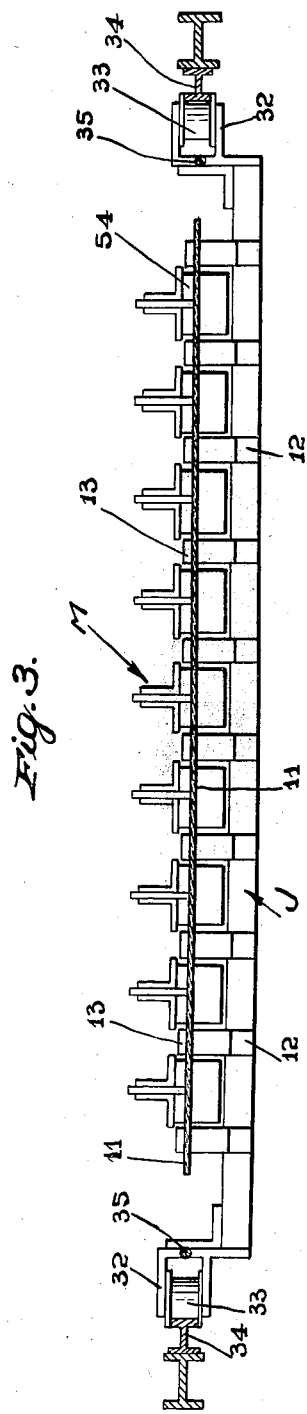
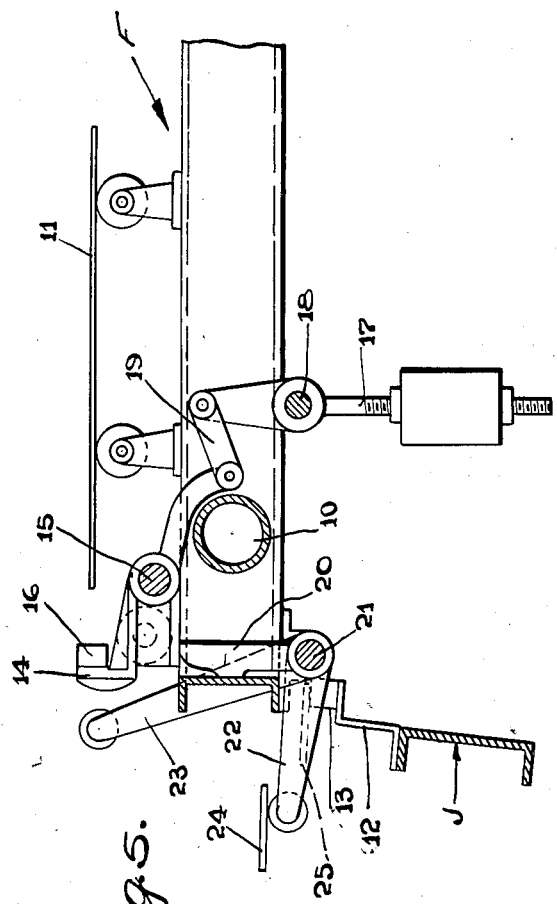
INVENTOR
HERMAN S. HEICHERT
BY Bradley Bee
ATTORNEYS Dec. 11, 1934.  H. S. HEICHERT  1,983,755
APPARATUS FOR HANDLING AND INSPECTING PLATE GLASS
Filed March 9, 1934  4 Sheets-Sheet 4
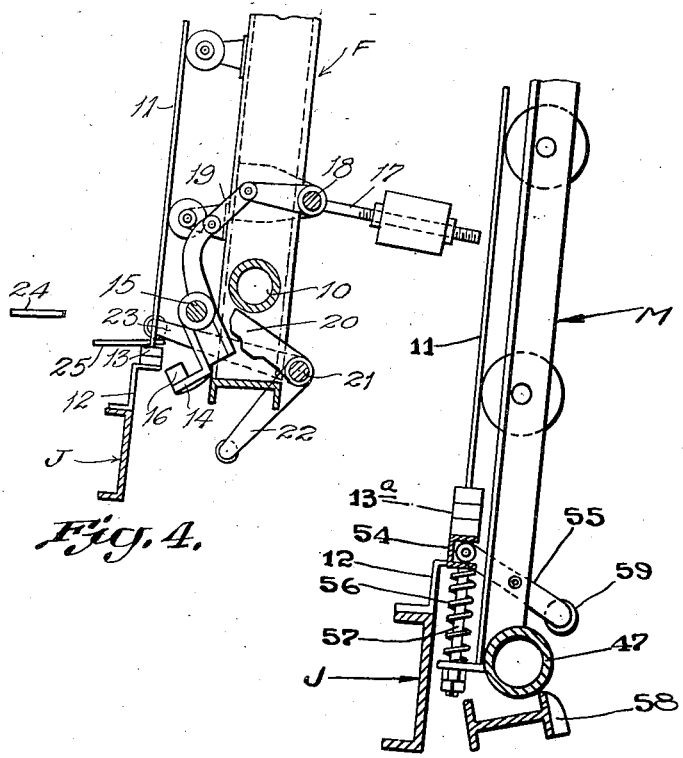
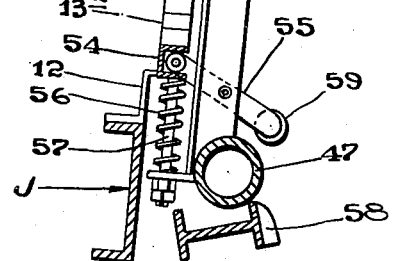
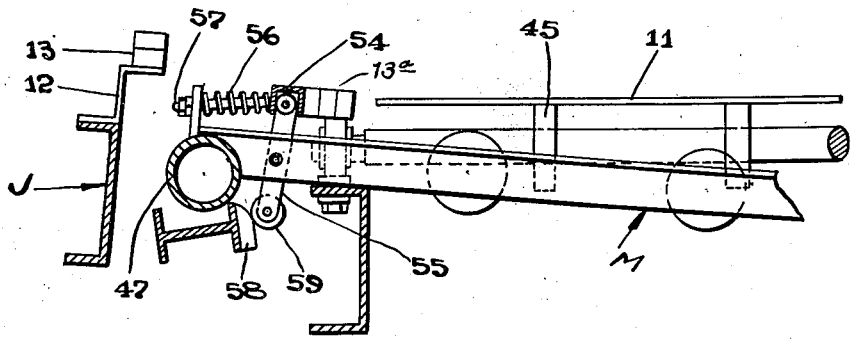
INVENTOR
HERMAN S. HEICHERT.
BY
ATTORNEYS Patented Dec. 11, 1934

1,983,755

UNITED STATES PATENT OFFICE 1,983,755

APPARATUS FOR HANDLING AND INSPECTING PLATE GLASS

Herman S. Heichert, Pittsburgh, Pa., assignor to Pittsburgh Plate Glass Company, a corporation of Pennsylvania Application March 9, 1934, Serial No. 714,836

9 Claims. (Cl. 214—1)

The invention relates to apparatus for handling and inspecting polished plate glass. It comprises means for transferring the glass plates at one level at which they have been washed and dried to prepare them for inspection, to a lower level at which they are cut to the desired sizes, the plates in the course of such movement being carried in an approximately vertical plane past an inspection station. The invention has for its principal objects the provision of an improved apparatus which handles the glass with safety and with practically no hand labor except that exercised by the operator in the cage of the crane, who controls the manipulation of the vacuum frame, and by the inspector past whom the glass plates are moved in their transfer from the upper to the lower level. The control by these operators is through the medium of electrically operated devices, so that their work is reduced to a minimum and the result in the amount of glass inspected per unit of labor is correspondingly increased. One embodiment of the invention is illustrated in the accompanying drawings, wherein:

Figure 1 is a vertical section on the line I—I of Fig. 2. Fig. 2 is a vertical section on the line II—II of Fig. 1. Fig. 3 is a horizontal section on the line III—III of Fig. 1. Figs. 4 and 5 are enlarged detail views both taken at the point marked X on Fig. 1 and showing the parts in two different positions. And Figs. 6 and 7 are enlarged detail views taken at the point marked Y in Fig. 1 and showing the parts in two different positions.

Referring to the drawings, A is the building in which the apparatus is housed having the upper floor B and the lower floor C, the inspection of the glass taking place in the transfer of the glass sheets from floor B to floor C through the slot D in the upper floor. Extending longitudinally of the structure on the upper floor is a conveyor E by means of which the glass sheets to be inspected are brought from the washing and drying apparatus. Alongside of the conveyor E is a tilting transfer frame F which is mounted for tilting movement from a horizontal position to an upright position (as indicated in dotted lines), and to which the glass sheets to be inspected are transferred from the conveyor E by means of a vacuum frame $E^2$, such vacuum frame being carried upon an overhead crane G. Extending between the upper and lower floors is a guide frame H made up of parallel bars provided with rollers, as indicated in Fig. 2, and below which is an inspection slot, as indicated at I. Mounted upon the guide frame is a vertically movable carrier in the form of the beam J, by means of which the glass sheets which are received from the transfer frame F on the upper floor are moved down between the floors for the inspection of the operator. Opposite the slot I is an inspection platform K, on which the operator stands in order to inspect the glass, suitable lighting means L being provided in opposition to the slot I to give the necessary illumination of the glass for inspection purposes. Mounted on the lower floor C is a tilting transfer frame M, which receives the glass sheets from the carrier J, and after this inspection, moves them to a horizontal position where they are placed upon a conveyor table N for transfer to a suitable cutting apparatus, which is not shown.

The conveyor table E, which forms no part of the invention, and by means of which the glass is brought to a position opposite the transfer frame F, is made up of rollers 1 having sprockets on their ends driven from the sprocket chain 2, as is common in this type of apparatus. The vacuum frame $E^2$ is mounted for vertical movement with respect to the cage 3, in which an operator is located, and such cage is supported on the crane G which is provided with wheels and rides upon the track 4, so that after the glass sheet has been picked up by the vacuum frame, such frame can be moved to a position over the tilting frame F, upon which it is deposited. The vacuum frame is guided vertically and is moved up and down by the crank 5 which is provided with a connecting rod 6. The crank 5 is driven from an electric motor 7 through the intermediary of suitable reduction gearing including the gears 8.

The tilting frame F is made up of parallel bars 9 provided with rollers, and such frame is pivoted upon the hollow shaft 10. The tilting frame is shown in full lines in horizontal position and in dotted lines in upright position. Fig. 5 illustrates on an enlarged scale the position of certain of the movable parts at the pivoted edge of the table when the frame is in horizontal position, while Fig. 4 shows these same movable parts in the position to which they are moved when the frame is in upright position. In both of these views, the glass lowering bridge or carrier J is shown in its upper position, at which time it is in position to receive the sheet of glass 11, which has been carried to upright position by the frame F. The upper edge of the carrier J, which is in the form of a channel is provided with brackets 12, on which are mounted felt strips 13 for cushioning the edge of the glass sheet. In order to prevent the glass sheet 11 from sliding off of the tilting frame F while such frame is being moved from horizontal to vertical position, a plurality of toes 14 are provided in the form of arms or levers which are pivoted upon the shaft 15 and provided with felt pads 16 on their faces next to the glass. When the frame F is in horizontal position, as indicated in Fig. 5, the toes are held in the position indicated in this figure by means of the weighted arms 17 pivoted at 18 and connected to the toes by means of the links 19. The toes are also locked in this position by the dogs 20 keyed to the shaft 21, such shaft also having keyed thereto the locking arm 22 and the unlocking arm 23. When the table arrives at horizontal position, the arm 22 strikes a fixed abutment 24 suitably placed upon the superstructure and positively moves the dog 20 to the position shown in Fig. 5. These dogs insure that the toes will be positively locked in the position indicated in Fig. 5 until the tilting frame approaches its upright position, as indicated in Fig. 4, at which time the locking dogs are released, so that the toes are moved away from the edge of the glass sheet permitting such sheet to rest upon the carrier J, as indicated in Fig. 4. The dogs are released when the frame F approaches upright position by reason of the engagement of the unlocking arm 23 with an abutment 25 suitably secured to the superstructure of the apparatus. This causes the dogs to swing to the position indicated in Fig. 4, at which time the toes 14 are withdrawn by the weight carried by the arm 17.

The swinging movement of the frame F is accomplished by means of a motor 26 beneath the frame which operates a crank 27 through suitable reduction gearing, such crank being in turn connected to the lower end of the connecting rod 28, whose upper end is pivoted to the bottom of the frame F. In order to prevent the glass sheet from being accidentally swung to the left, so that it falls from the frame F when it arrives at upright position, a guard 29 is provided, such guard being pivoted upon the standards 30 at the side edges of the frame and having counterweighted arms 31 at its ends. As the frame moves to an upright position, the guard 29 is maintained at right angles to the frame, so that when the frame reaches its upright position, the end of the guard lies in opposition to the face of the glass plate and adjacent thereto, effectively preventing any accidental movement of the plate to the left which might cause it to leave the frame. Since the guard is in horizontal position when the frame is in its lower position, and the counterweights are at the side edges of the frame, there is no interference with the vacuum frame in transferring the glass sheets from the conveyor frame E to the transfer frame.

The bridge or carrier J is provided at each end with a cross head 32 provided with wheels 33 which are guided upon the upright beams 34. The carrier is moved up and down by means of cables 35 passing around sheaves 36 (Fig. 1), and around the drum 38. This drum 38 is driven from an electric motor 39 through suitable reduction gearing, a part of which is carried in the casing 40. The up and down movement of the carrier is controlled by the operator on the platform K through the intermediary of a switch 41, which controls the operation of the motor 39. The glass sheet supported upon the carrier is guided in its movement downward by means of the bars H which are provided with rollers for engaging the face of the glass sheet similar to those used upon the bars H. When the frame M is in the position indicated in Fig. 2, the bars H and 43 are spaced to provide the inspection slot I. This inspection slot is located at about the level of the face of the operator who stands upon the platform K, and lies opposite to the inspection light L, which preferably has a background 44. In inspecting the sheet, it is started from the position indicated in Fig. 4 and moved downward step by step so that its entire area passes the slot I, and it is in this period that the glass is inspected. The sheet finally arrives at the position indicated in Figs. 2 and 6, and may now be moved to horizontal position by the frame M and placed upon the conveyor N. As soon as the sheet is carried from the conveyor N, the frame M is moved back again to upright position so that the apparatus is ready for the inspection of another sheet.

The conveyor N consists of spaced rollers 45 driven by the sprocket chain 46 and interspersed with respect to the bars 43 constituting the tilting frame M, so that when the frame M is tilted slightly below the horizontal, the glass sheet rests upon the rollers 45 which are driven, so as to carry the glass sheet along the conveyor to the cutting apparatus, or to a suitable point where the glass may be removed and stored.

The tilting frame M is pivoted upon a shaft 47 and is tilted by means of a motor 48 (Fig. 1) which operates through a suitable reduction gearing 49 and worm gearing in the casing 50 to operate a worm shaft which carries the crank 51. This crank is connected to a bracket 52 projecting from the edge of the frame M by means of the connecting rod 53. The control of this tilting mechanism, as well as that of the downward movement of the carrier or bridge J, is accomplished by the inspector upon the platform K.

In making the transfer of the glass sheet from the carrier J to the frame M, it is necessary to shift the weight of the lower edge of the sheet from the pads 13 to a toe or abutment at the edge of the frame M. The supporting toe or abutment at the edge of the frame M preferably consists of a plurality of spaced members 54 mounted upon pivoted arms 55 and held in forward position by means of springs 56 on rods 57 which are pivoted to the arms 55. When the frame M is in upright position, the members 54 are interspersed between the sets of pads 13, so that when the pads 13 are lowered by the carrier J to a position below the top of the pads 13a on the members 54, the weight of the sheet is transferred to such members. The frame M which now supports the glass sheet can be swung to horizontal position. Since it is desirable that the edge of the glass sheet should be free from the pads 13a on the members 54, when the sheet is carried along the conveyor N, provision is made for automatically withdrawing the abutments 54 to the position indicated in Fig. 7 when the frame M arrives at horizontal position. This is accomplished by means of fixed cams 58 which engage rollers 59 on the ends of the arms 55 just before the frame M arrives at horizontal position. A retraction of the members 54 against the tension of the springs 56 is thus accomplished, leaving the glass free to be carried forward by the rotation of the rollers 45. When the frame M is tilted to upright position again, the arms 55 are withdrawn from the cams 58, so that the members 54 are moved outward again to their original positions.

In order to close the floor slot D while a glass sheet on the carrier J is in the position of Fig. 2, so that the inspector is protected from glass which might fall through the slot, the safety doors 59, 59 shown in Figs. 1 and 2 are provided. These doors are secured to pairs of swinging arms 60, 60 secured to the shafts 61, 61 and pressed toward closing position by the springs 63, 63. The arms 62, 62 carry rollers 64, 64 which are moved apart to open the doors when the carrier is in a partially lowered position during the inspection of the glass sheet. This is accomplished by the use of a pair of bars 65, 65 (Fig. 2) having their upper ends tapered to form the cam surfaces 66, 66 (Fig. 1). These cam ends engage the rollers 64, 64 when the carrier J is moved up and hold the doors 59 open until such ends move down below the rollers, at which time the springs 63, 63 close the doors.

What I claim is:

1. In combination in a plate glass handling and inspection apparatus operating between an upper and a lower floor in which the upper floor is provided with a transfer slot, a tilting transfer frame on the upper floor pivoted along one edge adjacent the slot and provided at such edge with a retractable toe for supporting the glass plate when the frame is tilted to an upright position, a tilting transfer frame on the lower floor pivoted along one edge which lies beneath the slot so that the two frames when in upright position are in substantial alignment, a pair of upright guide frames which extend between the two floors, a carrier mounted for vertical movement on the guide frames and adapted to receive and support the lower edge of the glass plate when the toe on the upper floor transfer frame is retracted, a toe on the lower floor transfer frame adjacent the pivoted edge thereof adapted to engage the lower edge of the glass plate when the carrier approaches its lower limit of movement, and an inspection station opposite the line of movement of the glass sheet between the transfer frames positioned so that the operator thereon may inspect the area of glass lying above the end of the lower transfer frame.

2. In combination in a plate glass handling and inspection apparatus operating between an upper and a lower floor in which the upper floor is provided with a transfer slot, a tilting transfer frame on the upper floor pivoted along one edge adjacent the slot and provided at such edge with a retractable toe for supporting the glass plate when the frame is tilted to an upright position, a tilting transfer frame on the lower floor pivoted along one edge which lies beneath the slot so that the two frames when in upright position are in substantial alignment, a pair of upright guide frames which extend between the two floors, a carrier mounted for vertical movement on the guide frames and adapted to receive and support the lower edge of the glass plate when the toe on the upper floor transfer frame is retracted, a guide for the face of the glass extending down from the upper floor to a point above the upper edge of the lower floor transfer frame when such frame is in upright position, thus providing an unobstructed horizontal inspection slot, a toe on the lower floor transfer frame adjacent the pivoted edge thereof adapted to engage the lower edge of the glass plate when the carrier approaches its lower limit of movement, and an inspection station opposite the inspection slot.

3. In combination in a plate glass handling and inspection apparatus operating between an upper and a lower floor in which the upper floor is provided with a transfer slot, a tilting transfer frame on the upper floor pivoted along one edge adjacent the slot and provided at such edge with a retractable toe for supporting the glass plate when the frame is tilted to an upright position, a tilting transfer frame on the lower floor pivoted along one edge which lies beneath the slot so that the two frames when in upright position are in substantial alignment, a pair of upright guide frames which extend between the two floors, a carrier mounted for vertical movement on the guide frames and adapted to receive and support the lower edge of the glass plate when the toe on the upper floor transfer frame is retracted, a toe on the transfer frame on the lower floor adjacent the pivoted edge thereof adapted to engage the lower edge of the glass plate when said carrier approaches its lower limit of movement, and means actuated on the movement of the upper floor transfer frame for securing the retraction of the toe carried thereby when such frame approaches the limit of its movement toward its upright position.

4. In combination in a plate glass handling and inspection apparatus operating between an upper and a lower floor in which the upper floor is provided with a transfer slot, a tilting transfer frame on the upper floor pivoted along one edge adjacent the slot and provided at such edge with a retractable toe for supporting the glass plate when the frame is tilted to an upright position, a tilting transfer frame on the lower floor pivoted along one edge which lies beneath the slot so that the two frames when in upright position are in substantial alignment, a pair of upright guide frames which extend between the two floors, a carrier mounted for vertical movement on the guide frames and adapted to receive and support the lower edge of the glass plate when the toe on the upper floor transfer frame is retracted, a toe on the lower floor transfer frame at the pivoted edge thereof mounted for movement toward and from the opposite edge of the frame and adapted to engage the glass plate when said carrier approaches its lower limit of movement, a horizontal transfer table on the lower floor in position to receive the glass plate carried by the lower floor transfer frame when it is swung to horizontal position, such table being provided with driven rollers for moving the glass plate along the table having their axes of rotation at right angles with the axis around which the transfer frame tilts, and means operated by the tilting of the transfer frame for retracting the toe thereon when the frame approaches its horizontal position.

5. In combination in a plate glass handling and inspection apparatus operating between an upper and a lower floor in which the upper floor is provided with a transfer slot, a tilting transfer frame on the upper floor pivoted along one edge adjacent the slot and provided at such edge with a retractable toe for supporting the glass plate when the frame is tilted to an upright position, a tilting transfer frame on the lower floor pivoted along one edge which lies beneath the slot so that the two frames when in upright position are in substantial alignment, a pair of upright guide frames which extend between the two floors, a carrier mounted for vertical movement on the guide frames and adapted to receive and support the lower edge of the glass plate when the toe on the upper floor transfer frame is retracted, a toe on the transfer frame on the lower floor adjacent the pivoted edge thereof adapted to engage the lower edge of the glass plate when said carrier approaches its lower limit of movement, means for retracting the toe on the upper floor transfer frame, a locking member for holding such toe in operative position, and release means for the locking member which is actuated when the upper floor transfer frame approaches the limit of the upward movement.

6. In combination in a plate glass handling and inspection apparatus operating between an upper and a lower floor in which the upper floor is provided with a transfer slot, a tilting transfer frame on the upper floor pivoted along one edge adjacent the slot and provided at such edge with a retractable toe for supporting the glass plate when the frame is tilted to an upright position, a tilting transfer frame on the lower floor pivoted along one edge which lies beneath the slot so that the two frames when in upright position are in substantial alignment, a pair of upright guide frames which extend between the two floors, a carrier mounted for vertical movement on the guide frames and adapted to receive and support the lower edge of the glass plate when the toe on the upper floor transfer frame is retracted, a toe on the transfer frame on the lower floor adjacent the pivoted edge thereof adapted to engage the lower edge of the glass plate when said carrier approaches its lower limit of movement, means for retracting the toe on the upper floor transfer frame, a locking member for holding such toe in operative position, release means for the locking member which is actuated when the upper floor transfer frame approaches the limit of its upward movement, and means for resetting the locking member by the movement of the transfer frame back to horizontal position.

7. In combination in glass handling apparatus, a tilting transfer frame pivoted adjacent one edge and adapted to be swung from a horizontal position to an upright position approaching the vertical, a toe at the pivoted edge of the frame for engaging the edge of the glass plate and supporting the plate as the frame swings to upright position, standards projecting at right angles to the frame at the edge thereof remote from the pivoted edge, a guard pivoted on the standards and extending horizontally when the frame is in horizontal position, and counterweight means for the guard holding it in horizontal position as the frame moves from horizontal to upright position, said guard being positioned so that when the frame is in upright position, its end lies in front of the glass plate and adjacent thereto to prevent the plate from being accidentally displaced from the frame.

8. In combination in a plate glass handling and inspection apparatus operating between an upper and a lower floor in which the upper floor is provided with a transfer slot, a tilting transfer frame on the upper floor pivoted along one edge adjacent the slot and provided at such edge with a retractable toe for supporting the glass plate when the frame is tilted to an upright position, a tilting transfer frame on the lower floor pivoted along one edge which lies beneath the slot so that the two frames when in upright position are in substantial alignment, a pair of upright guide frames which extend between the two floors, a carrier mounted for vertical movement on the guide frames and adapted to receive and support the lower edge of the glass plate when the toe on the upper floor transfer frame is retracted, and a spring supported toe on the lower floor transfer frame adjacent the pivoted edge thereof adapted to engage the lower edge of the glass plate when the carrier approaches its lower limit of movement, and an inspection station opposite the line of movement of the glass sheet between the transfer frames positioned so that the operator thereon may inspect the area of glass lying above the end of the lower transfer frame.

9. In combination in a plate glass handling and inspection apparatus operating between an upper and a lower floor in which the upper floor is provided with a transfer slot, a tilting transfer frame on the upper floor pivoted along one edge adjacent the slot and provided at such edge with a retractable toe for supporting the glass plate when the frame is tilted to an upright position, a tilting transfer frame on the lower floor pivoted along one edge which lies beneath the slot so that the two frames when in upright position are in substantial alignment, a pair of upright guide frames which extend between the two floors, a carrier mounted for vertical movement on the guide frames and adapted to receive and support the lower edge of the glass plate when the toe on the upper floor transfer frame is retracted, a toe on the lower floor transfer frame adjacent the pivoted edge thereof adapted to engage the lower edge of the glass plate when the carrier approaches its lower limit of movement, closure means for the transfer slot through the upper floor yieldingly held in closed position, and means for opening the closure means operated by the carrier and held open thereby until the upper edge of the glass plate upon the carrier passes below said means, and an inspection station opposite the line of movement of the glass sheet between the transfer frames positioned so that the operator thereon may inspect the area of glass lying above the end of the lower transfer frame.

HERMAN S. HEICHERT.